US012290820B1

(12) United States Patent
Reeves et al.

(10) Patent No.: US 12,290,820 B1
(45) Date of Patent: May 6, 2025

(54) SYSTEMS AND METHODS TO BREAKDOWN HETEROGENEOUS MATERIAL

(71) Applicants: Robert Reeves, Arvada, CO (US); David Scriven, Casper, WY (US)

(72) Inventors: Robert Reeves, Arvada, CO (US); David Scriven, Casper, WY (US)

(73) Assignee: IronTech Resources, LLC, Casper, WY (US)

( * ) Notice: Subject to any disclaimer, the term of this patent is extended or adjusted under 35 U.S.C. 154(b) by 0 days.

(21) Appl. No.: 18/925,401

(22) Filed: Oct. 24, 2024

Related U.S. Application Data

(60) Provisional application No. 63/546,559, filed on Oct. 31, 2023.

(51) Int. Cl.
*B02C 19/00* (2006.01)

(52) U.S. Cl.
CPC .................................. *B02C 19/005* (2013.01)

(58) Field of Classification Search
CPC .............................................. B02C 19/06–068
See application file for complete search history.

(56) References Cited

U.S. PATENT DOCUMENTS 3,811,623 A * 5/1974 Speer .................. B01D 21/283 241/20
6,824,086 B1 * 11/2004 Mazurkiewicz ...... B02C 19/065 241/39
9,914,132 B2 * 3/2018 Coates .................... B02C 23/10
9,925,590 B2 3/2018 Čelko et al.
2014/0084088 A1 * 3/2014 Coates .................... B02C 23/10 239/420
2016/0280551 A1 * 9/2016 Hasegawa ............. B02C 19/061
2019/0105661 A1 * 4/2019 Harrison ................ B01D 17/02
2019/0105662 A1 * 4/2019 Harrison ................ B01D 17/02
2020/0055009 A1 * 2/2020 Galaka ................ B01F 25/1042

OTHER PUBLICATIONS

Official Action for U.S. Appl. No. 18/928,290, dated Dec. 12, 2024, 18 pages.

* cited by examiner

*Primary Examiner* — Bobby Yeonjin Kim
(74) *Attorney, Agent, or Firm* — Sheridan Ross PC

(57) ABSTRACT

Heterogeneous mineral-based particulate is comminuted by exposing the particulate to a cavitation fluid. In another embodiment, two or more streams of fluids with particulate entrained therein may be directed at one another to create, in an impact zone, collisions between the particulate of the two or more streams of fluid. Exposing the particulate to the cavitation fluid may occur inside or outside the impact zone, either before, at the same time, or after the collisions.

2 Claims, 4 Drawing Sheets

| SCREEN FRACTION SIZE, MICRONS | | MATERIAL BEFORE CAVITATION | | | MATERIAL AFTER CAVITATION | | |
|---|---|---|---|---|---|---|---|
| PASS | RETAIN | DIRECT WT% | CUMULATIVE WT% PASS | CUMULATIVE WT% RETAIN | DIRECT WT% | CUMULATIVE WT% PASS | CUMULATIVE WT% RETAIN |
| 1000 | 850 | 11.4 | 100.0 | 11.4 | 9.4 | 100.0 | 9.4 |
| 850 | 425 | 12.4 | 88.6 | 23.8 | 11.8 | 90.6 | 21.1 |
| 425 | 212 | 19.7 | 76.2 | 43.5 | 17.3 | 78.9 | 38.5 |
| 212 | 106 | 26.0 | 56.5 | 69.4 | 20.9 | 61.5 | 59.4 |
| 106 | 53 | 18.6 | 30.6 | 88.1 | 19.4 | 40.6 | 78.8 |
| 53 | 0 | 11.9 | 11.9 | 100.0 | 21.2 | 21.2 | 100.0 |

FIG. 4

SYSTEMS AND METHODS TO BREAKDOWN HETEROGENEOUS MATERIAL

RELATED APPLICATIONS

This application is a nonprovisional of, and relates and claims priority to, U.S. provisional patent application Ser. No. 63/546,559, filed on Oct. 31, 2023.

FIELD OF THE DISCLOSURE

The disclosure relates generally to systems and methods to breakdown a heterogeneous material into its components, and more specifically in one embodiment, to break composite particulate solids, such as iron, gold, silver, uranium, copper and similar metallic ores and tailings, into their component parts.

BACKGROUND

Heterogeneous solid materials occur naturally and may be formed by manmade processes. For example, naturally occurring ores may include volumes containing a material of interest (i.e., a "bearing fraction"), such as a metal or a mineral, mixed with volumes not containing the material of interest (i.e., a "non-bearing fraction" or gangue). Most ores and tailings produced worldwide include a small percentage (perhaps less than one percent) of valuable minerals containing gold, silver, copper, lead, and zinc compounds, among others, and a more significant percentage of other waste minerals, typically referred to as gangue, containing silicates and carbonates, among others, that have little or no value.

Recovery of the material of interest generally requires physical or chemical separation of the bearing fraction from the non-bearing fraction. The valuable portion of ores and tailings requires liberation from gangue to achieve recovery. Liberation occurs when ores and tailings are broken into sufficiently small particles, typically by crushers and tumbling mills.

Crushers, including gyratory, jaw, and cone crushers, break run-of-mine ore into smaller pieces. Those pieces may advance to tumbling mills that include autogenous grinding (AG) mills, semi-autogenous grinding (SAG) mills, rod mills, ball mills, stirred mills, vertical mills, among others for further particle size reduction. The tumbling-stirred-, and vertical mills indiscriminately break the incoming particles into small fragments by impact and abrasion between hard balls or rods with little or no regard to their physical composition or characteristics.

However, indiscriminate breakage can produce an abundance of very small particles (e.g., 25 micrometers or less), often called slimes, composed of valuable minerals and waste minerals. Slimes are difficult to separate into their component materials and resist separation from water or other liquids. Slimes are challenging to manage in tailings storage facilities and can be problematic for dewatering for efficient transport. Numerous examples exist of slimes held in tailings storage facilities that have ruptured, creating enormously destructive fluidized flows of unconsolidated slimes, some of which have buried homes and structures.

Tumbling mills require significant electrical energy to rotate the equipment and lift or move the contained rods and balls into contact with the incoming feed material. For example, tumbling mills can require 10 kWh or more electrical energy, expressed as the Bond Work Index, to grind one short ton of relatively coarse material to 100 micrometers. In applications requiring comminution to very small particles, perhaps smaller than 25 micrometers, the specific energy consumption for tumbling and high intensity grinding mills can be 50 kWh per short ton or more. One scholarly study determined that only one percent of the electrical energy used to operate ball mills is expended on creating a new mineral surface through breakage. The balance of the electrical energy, 99 percent, is dissipated as noise, heat, and vibration.

Existing breakage devices also experience significant wear on their parts. The processing of mining feeds is done on a very large industrial scale, and as such, the equipment required is quite expensive to purchase and maintain. For example, operators of tumbling mills have reported that the consumption rate of expensive steel alloy liners and grinding media due to impact, abrasion, and corrosion may exceed 0.5 kilogram per metric ton of ore.

Considerable resources have been devoted to improving breakage efficiency by crushers, impact mills, and tumbling mills. However, these existing methods have reached practical limitations, and the industry can only expect incremental benefits. Therefore, new technologies are needed to significantly reduce energy consumption.

Recently, methods have been developed to break ores by accelerating individual particles in a flowing fluid and directing the streams of particles with a plurality of nozzles to cause collisions. See U.S. Pat. No. 9,914,132. This method of initiating particle-to-particle collisions is effective when the kinetic energy, a product of the particle mass and velocity, is sufficient to create cracks in the particles upon collision. However, pumping the fluid carrying the particles imposes a practical velocity limit. Thus, this method can only achieve breakage of relatively large particles, greater than about 850 micrometers (20 US mesh), with the inherent kinetic energy necessary to create fractures upon collisions. For example, the practical maximum velocity experienced by particles flowing through a nozzle is less than 30 meters per second. A 4.75 mm diameter (4 US mesh) iron ore particle has a specific energy, based on its mass and velocity, of 450 Joules per kilogram, a value that is sufficient to create fractures when colliding with another similar particle approaching from the opposite direction. However, an 850-micrometer particle has only 0.5 percent of the kinetic energy of the larger 4.75 mm particle, a lesser value that may be insufficient to create the desired breakage.

Ores presently mined require breakage into small particles, perhaps less than 100 micrometers, to liberate the valuable mineral from the gangue. Future trends have identified that the valuable minerals will require finer grinding, perhaps to 25 micrometers or less, to achieve liberation because of the changing characteristics of ores. Researchers have examined these trends toward grinding to smaller sizes and have identified the energy required to achieve the desired particle size. Many tailings, especially the iron tailings deposited along the Mesabi Range in Minnesota, USA, require fine grinding to liberate the iron minerals that can be concentrated to a grade suitable for blast furnaces. However, exponentially more energy is required to grind to smaller and smaller sizes on a per kilogram basis. Rising electricity costs have made the exploitation of ores that require fine grinding unattractive. This is particularly worrisome because of the increasing demand for minerals used in manufacturing batteries and renewables. Those minerals require mining and processing ores that require fine grinding.

Upon breakage, the liberated valuable minerals are amenable to separation based on the differences in their physical, chemical, or other differentiating characteristics. Many separation methods are employed to concentrate the various liberated minerals and materials, including flotation, agglomeration, gravity separation, magnetic separation, leaching, and many others. Chemical separation may require reagents (e.g., cyanide, acids, bases), which may be expensive or raise environmental challenges.

One example of a heterogeneous material is iron ore tailings. Such tailings typically are found in legacy iron ore mining regions as barren waste lands. The tailings containing a low-grade iron ore may contain any form of iron-containing compounds in concentrations up to about 560 lbs of Fe equivalent per short ton of tailings (i.e., approximately 28% iron by weight), whereas higher grade iron ore may contain iron-containing compounds in concentrations of about 1300 lbs of Fe equivalent per short ton of ore (i.e., about 65% iron by weight).

Iron ore tailings are the waste product of mining and producing iron ore for the steel making industry. Historically, processing focused on the magnetic portion of the iron ore—the magnetite. Liberated magnetite was relatively easy to separate from the other portions of the iron ore using low-intensity magnets. The magnetite was liberated through a non-discriminate method of grinding, typically with the use of ball mills. The non-magnetic iron compounds along with the non-liberated magnetite and other minerals associated with the iron ore were deposited into low lying areas called tailings basins. These basins mostly have been left untouched for, in some cases, over 100 years. In the iron ore mining region of Minnesota, for example, there are over one billion tons of iron ore tailings covering thousands of acres of land which is largely unusable for anything else. This is the case all over the world in iron producing areas such as Australia, South Africa, and Brazil (i.e., to name just three of the larger iron producing regions).

Iron ore tailings have a high percentage of iron. Iron ores and iron tailings, comprise a substantial proportion, 30 percent or more, of iron. However, the iron compounds have been too difficult to separate in an economical method. It would therefore be advantageous to provide a method of iron ore recovery that alleviates these concerns.

Thus, there remains a need for an improved system and method to breakdown a heterogeneous material into its components.

SUMMARY

The present disclosure provides a system and method to breakdown a heterogeneous material into its components. In one embodiment, each of a plurality of pressurized fluid conduits is fluidly coupled to a separate pump and a separate nozzle. A fluid including a heterogeneous material is pumped through each conduit and exits each nozzle. The exiting fluids impact one another in an impact zone, resulting in kinetic collisions between particles within the fluid streams.

In one embodiment, energy may be added optionally to the impact zone by the delivery to the impact zone of cavitating fluid. In another embodiment, fluids including a heterogeneous material (e.g., either from the impact zone or from an independent supply) are contacted with a cavitating fluid outside the impact zone. In that way, the heterogeneous material breaks into its components.

Other benefits and advantages of the present disclosure will be appreciated from the following detailed description.

DESCRIPTION OF THE DRAWINGS

FIG. 4 is tabular data that shows the significant breakage of iron ore tailings processed by cavitation.

DETAILED DESCRIPTION

Figure 1:
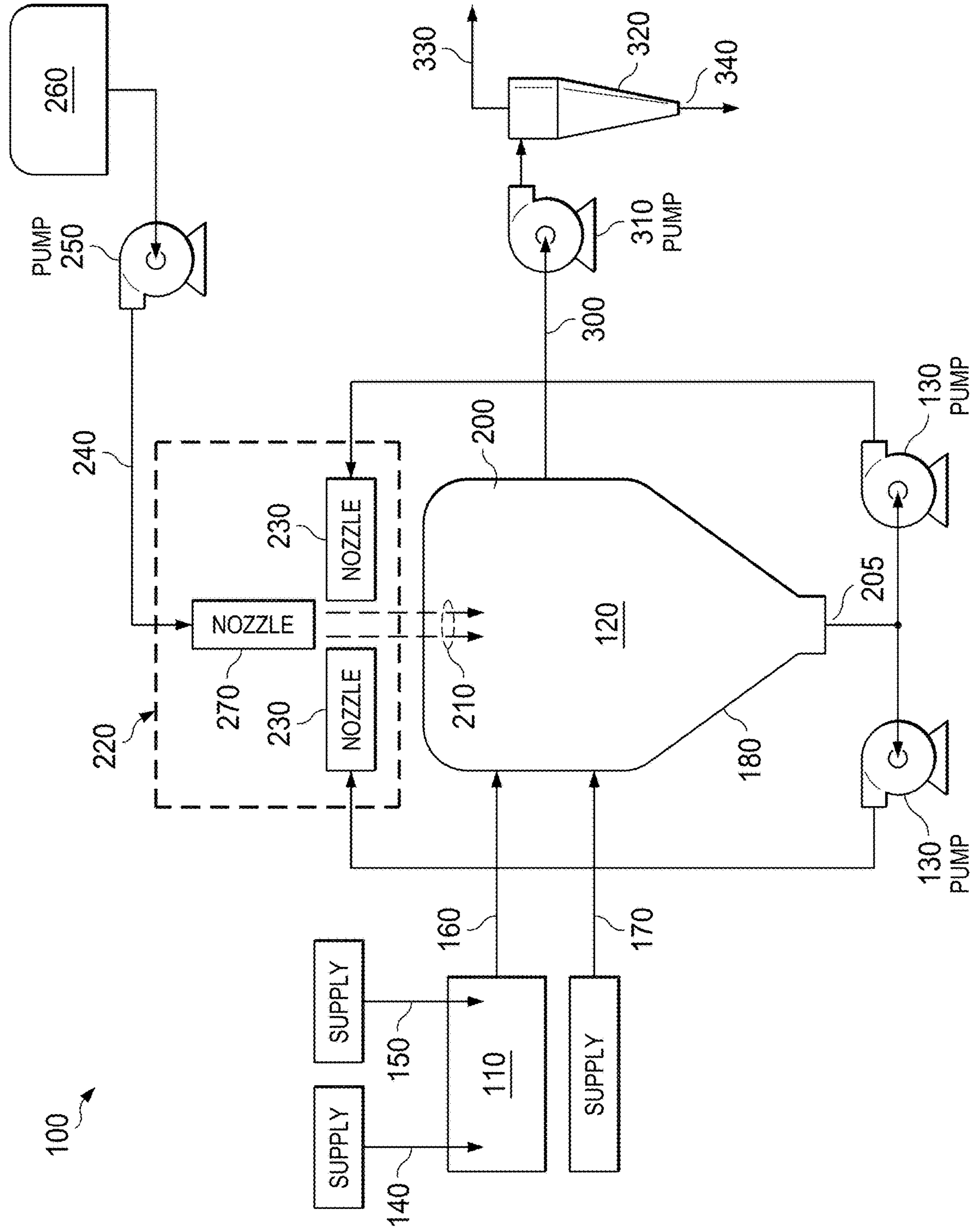
FIG. 1 is a simplified schematic illustrating an embodiment of a system to breakdown heterogeneous material.

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to material processing; etc. Such aspects related to this disclosure do not depart from the invention, and it is therefore intended that the invention not be limited by the certain aspects set forth of the events and circumstances related to this disclosure.

As used herein, the terms "liberate," "liberating," and "liberation" refer to a disassociation by any means. Particle liberation may occur via chemical means. Such disassociation also may be a wearing away by flexure, rebound, and distortion. The disassociation also may refer to a wearing away by friction, chipping, spalling, or another erosive process. For example, when particles are liberated, the boundary between different materials may become more highly stressed than the bulk materials themselves. Thus, liberation may be particularly applicable to physically separate the minerals along facies lines or mineral boundaries which have a weaker bond than the molecular bond of the mineral itself. Liberation imparts energy to the material being liberated to physically disassociate the material into various fractions (e.g., two solid fractions). The liberated particles may then be classified to divide the heterogeneous material into various fractions.

For convenience only, not every element or component of a system and method in accordance with the present disclosure is shown in the drawings. For example, a system in accordance with the present disclosure may include desired piping, connectors, sensors, controllers, etc., as would be understood by those of ordinary skill in the art having the benefit of this disclosure.

Also, for convenience only, the description herein mainly is directed to a process that is continuous flow. However, those of ordinary skill in the art having the benefit of this disclosure would understand that batch mode processing also may be used.

Research and operating experience demonstrate that smaller particles require more specific energy (Joules per kilogram) to create breakage than larger particles. For example, an 850 micrometer (20 US mesh) iron ore particle is expected to require more than three times the specific energy for breakage than a 4.75 mm iron ore particle. This is consistent with the observed fact that small particles when compared to large particles, possess fewer cracks, voids, and defects that can promote breakage.

The present disclosure provides new systems and methods devoid of the inefficiencies inherent in prior breakage methods that use impact or abrasion to break ore or tailings. Thus, it creates new opportunities to process ores, tailings, and low-grade resources that are not amenable to treatment with existing methods that rely on kinetic energy of a fluid transport stream to initiate breakage or tumbling mills that consume great amounts of energy and experience significant wear on the liners and grinding media.

In accordance with the present disclosure, the forces created by hydrodynamic cavitation (HDC), a particular class of cavitation, are directed onto particulate material. In that way, particles smaller than can be broken by kinetic energy methods are effectively broken. The phenomenon of single particle breakage methods is used to break ores and tailings of all grades comprised of two or more minerals along the boundaries between the minerals. Typically, the energy required to break the bond between mineral grains is less than the energy required to fracture the crystalline lattice of a mineral. For example, research conducted by the United States Bureau of Mines (USBM) determined that magnetite, an important ferrous mineral, is weakly bonded to quartz, a common gangue mineral, and is likely to be separated from one another with less force than required to fracture magnetite or quartz. Thus, breakage first occurs along the mineral boundaries for many ores and tailings and, to a lesser extent, through the mineral crystal lattice. Further, the present disclosure provides for the application of forces to each particle, unlike tumbling and stirred mills that impact particles en masse between balls and rods. The resulting method of breakage avoids the generation of slimes, a class of small particles, typically less than 25 micrometers, that can pose downstream problems in concentrating the valuable mineral and disposing of the tailings.

In accordance with the disclosure, particle breakage may be achieved by harnessing and directing the enormous forces created when cavitation bubbles collapse onto individual particles, causing fractures at grain boundaries. Cavitation is a phenomenon that has been observed by industry and science for many years. Cavitation occurs when a fluid, typically water, enters a zone of sufficiently low pressure below its vapor pressure. During exposure to the low-pressure zone, the fluid boils to create vapor bubbles. For example, when ambient temperature water experiences a pressure of less than 2.5 kPa, the liquid phase is transformed into its vapor phase. As the vapor bubble advances to a higher-pressure zone, perhaps at atmospheric pressure or greater, the vapor is condensed back into its liquid phase. The transformation between vapor and liquid is accompanied by a great reduction in volume. The collapse of the vapor bubble occurs suddenly with an attending shock wave with a brief but potent burst to force. The force is often sufficient to damage hardened steel and most any other solid that can readily damage and ultimately destroy ship propellors, pump impellors, and many other wetted surfaces that are exposed to cavitation conditions. Designers make a great effort to create designs that in fact avoid cavitation to reduce damage to machinery and structures.

Cavitation can be intentionally created by several methods. HDC can generate a large volume of bubbles required for industrial-scale applications such as those of the present disclosure. HDC systems pass fluid through a converging-diverging (CD) venturi nozzle to generate cavitation bubbles in the low-pressure zone as described by principles presented in the Bernoulli equation of fluid flows. For example, the diameter of portions of a CD nozzle becomes narrow to accelerate the fluid. The pressure decreases as the fluid velocity increases. Designs provide sufficiently low pressure that is below the fluid's vapor pressure to create cavitation. Other methods can produce cavitation on a small scale. For example, ultrasonic probes create cavitation in a process called sonification. Lasers have been used in the laboratory to create singular cavitation bubbles for research purposes.

In one embodiment, a method in accordance with the present disclosure includes entraining heterogeneous particles into a fluid stream. The fluid stream is passed through at least one nozzle of a system, and the fluid stream is impacted to liberate the heterogeneous particles via kinetic collisions involving particles within the fluid stream. In one embodiment, a plurality of fluid streams, each pressurized by a separate pump, impact one another in an impact zone to liberate the heterogeneous particles. In another embodiment, a cavitating liquid also is provided to the impact zone, resulting in increased energy available for breaking particles.

In one embodiment, the present system may be used with iron ore tailings. Iron ore includes magnetite, hematite and goethite as iron bearing minerals surrounded primaily by quartz. In iron ore tailings, the magnetite has largely been removed from the initial processing of the iron ore leaving the hematite and goethite.

An exemplary system for processing a heterogeneous material is shown schematically in FIG. 1. The system 100 includes a hopper 110 in fluid communication with a processing tank 120. Pumps 130 are in fluid communication with the tank 120.

In one exemplary embodiment, a heterogeneous material 140 of solid particles is provided to the hopper 110. Also provided to the hopper 110 is a liquid 150. The hopper 110 may include a mixer to stir together the heterogeneous material 140 and the liquid 150 to form a slurry 160 that is provided to tank 120. In an alternate embodiment, the slurry is provided to the hopper 110, which then acts as a holding tank that feeds tank 120.

The heterogeneous material 140 may include solid particles or a mixture of solid particles with a liquid. For example, the heterogeneous material 140 may include a portion of an ore containing a metal (e.g., uranium, gold, copper, iron, lead, zinc, silver, and/or a rare-earth element)

to be recovered. In some embodiments, the heterogeneous material 140 may be oil-contaminated sand. The heterogenous material 140 may include the ferrous minerals magnetite, hematite, goethite, or siderite; and may include taconite tailings. The heterogeneous material 140 may have a solids concentration of about 1-40% volume percent.

The liquid 150 may include water (e.g., groundwater, process water, culinary or municipal water, distilled water, deionized water, etc.), an acid, a base, an organic solvent, a surfactant, a salt, or any combination thereof. The liquid 150 may include dissolved materials, such as a carbonate or oxygen. In some embodiments, the liquid may be substantially pure water, or water removed from a water source (e.g., an underground aquifer) without purification and without added components. The composition of the liquid may be selected to balance economic, environmental, and processing concerns (e.g., mineral solubility or disposal). The liquid may be selected to comply with environmental regulations. In one embodiment, the liquid may be substantially free of a reagent (e.g., a leachate, an acid, an alkali, cyanide, lead nitrate, etc.) that is formulated to chemically react with the particles in the heterogeneous material 140. In another embodiment, a reagent may be included.

The tank 120 has an inlet configured to receive the slurry 160 from the hopper 110. The tank 120 in another embodiment may be adapted with an additional inlet through which a fluid 170 may be provided to the tank 120. One example of a fluid that may be provided to tank 120 is the liquid 150. The tank 120 may include a volume that narrows toward the ground, such as a conical portion 180. The narrowed volume may direct solids of the mixed heterogeneous material 200 into an outlet 205 at the bottom of the tank 120. The pumps 130 may be in fluid communication with the tank 120 and may draw the mixed heterogeneous material 200 from the outlet 205 of the tank 120.

The pumps 130 may transport a mixed heterogeneous material 200 from tank 120. The mixed heterogeneous material 200 may include a mixture of (i) heterogeneous material 140 supplied from the hopper 110 and (ii) a liberated heterogeneous material 210 that has cycled through a portion of the system 100.

The mixed heterogeneous material 200 is provided by the pumps 130 to an impact zone 220. Each pump 130 may be a horizontal centrifugal pump, an axial centrifugal pump, a vertical centrifugal pump, or any other pump adapted and configured to pressurize and transport the mixed heterogeneous material 200. The pumps 130 may be selected such that solid particles of the mixed heterogeneous material 200 may pass through the pump 130 at an appropriate flow rate without damaging the pumps 130. For example, in one exemplary embodiment, the pumps 130 may be selected to pump 30 gallons per minute (gpm) (1.9 liters per second (l/s) of a mixed heterogeneous material 200 containing particles up to about 0.25 in. (6.35 mm) in diameter at a pressure of 32 pounds per square inch (psi) (221 kilopascals (kPa)). For example, the pumps 130 may be 5-horsepower pumps available from GPM (Duluth, MN). The pumps 130 may deliver any selected pressure and flow rate, which may be selected by a person having ordinary skill in the art having the benefit of this disclosure based on the requirements for a particular application (e.g., a selected heterogeneous material 140 feed stock composition and flow rate). A flow rate of 10 gallons per minute to 2000 gallons per minute may prove advantageous. Pumps 130 may communicate with or be controlled by a controller such as a computer. The controller may detect operating conditions of the system 100 via sensors placed in various locations in the system 100 and adjust the operation of the pumps 130 accordingly.

A plurality of pressurized streams of mixed heterogeneous material 200 are provided by the pumps 130 to the impact zone 220. Each pressurized stream of mixed heterogeneous material 200 is delivered to the impact zone 220 via separate nozzles 230. In one embodiment the nozzles 230 are each adjustable to create in the impact zone 220 a desired collision involving the pressurized streams of mixed heterogeneous material 200. The collision involving the pressurized streams of mixed heterogeneous material 200 liberates solid particles, creating flow 210.

A fluid 240 may be pumped via pump 250 from a holding tank 260 through a specially designed nozzle 270 to cause cavitation immediately upon leaving the nozzle 270. Providing the cavitating fluid to the impact zone 220 adds energy to the impact zone 220, increasing breakage of particles. The increasingly comminuted mineral-based particulate may vary in size from about 5 microns or greater.

The disclosed system can be utilized in a variety of configurations. In one embodiment, a cavitation nozzle is provided proximate to where particles accelerated by the nozzles 230 collide to create particle-to-particle impacts that cause breakage, particularly among the larger particles. The cavitation bubbles created by the cavitation nozzle come into intimate contact with the particles. The cavitation bubbles collapse as they enter a pressure zone higher than the fluid's vapor pressure. The shock waves attendant to the collapse break the particles at their grain boundaries, including for small particles that would otherwise not break by collision. Adding cavitation bubbles to the collision process extends and enhances particle breakage, especially for smaller particles than 850 micrometers.

A stream 300 may be drawn off tank 120 via a transport pump 310 and provided to a separation system 320, where the stream 300 is separated into two or more components. For example, the separation system 320 may separate the stream 300 into light-density fines 330 and heavy-density fines 340. Liberation and separation may significantly reduce the amount of material to be further processed to recover one or more desired components of the material.

In one embodiment, the described system may include two or more processing tanks 120 operated in series. That is, the stream 300 drawn off a first processing tank 120 may be provided to the inlet of a second processing tank **120*a*. A plurality of processing tanks 120, 120*a*, 120*b*** . . . , etc. may be used in series, each with its own individually adjustable pumps, conduits, nozzles, cavitating fluid, impact zone, etc., until a desired product is obtained that is provided to a separation system.

In another embodiment, the final effluent (e.g., from a processing tank) is collected in a mixing tank. At least one cavitation nozzle installed at the mixing tank delivers a cavitating stream of water.

Figure 2:
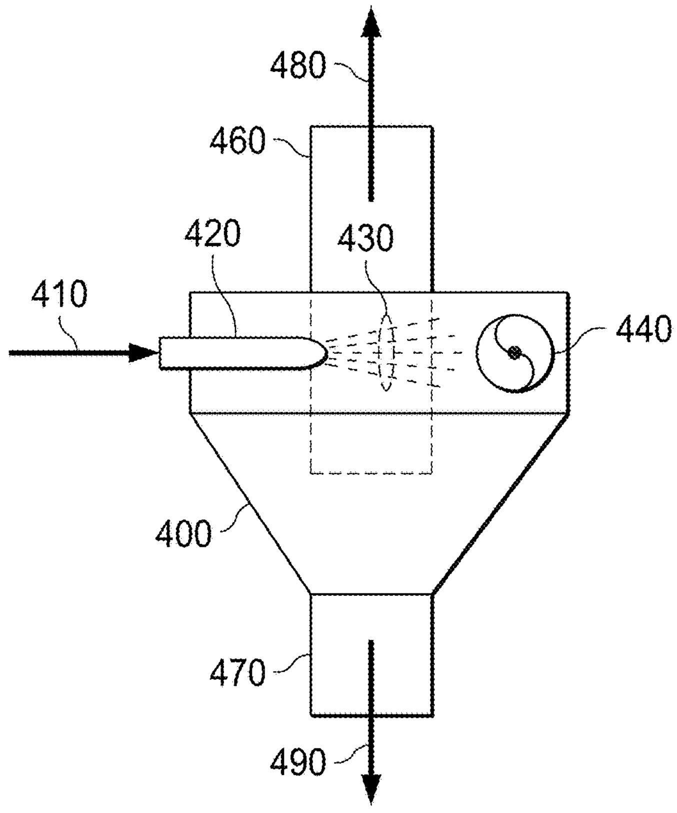
FIG. 2 is a simplified schematic illustrating an exemplary stand-alone tank for contacting heterogeneous material with a cavitation flow.

Again, the disclosed system can be configured as a standalone method to break particulate material, separate from a continuous streams process. As shown in FIG. 2, a cylindrical-conical vessel 400 efficiently contacts cavitation bubbles with particulate solids. A fluid, typically water 410 feeds a CD-style cavitation nozzle 420 to create a stream of cavitation bubbles 430 that can occupy between 1 percent and 90 percent of the fluid volume of the fluid 410 entering the nozzle 420. FIG. 2 depicts a single cavitation nozzle 420 for clarity. However, the flows from a plurality of cavitation nozzles can enter the vessel 400 to suit the application. Cavitation flows may enter either the cylindrical portion of the tank 400, the conical portion of the tank 400, or both.

Figure 3:
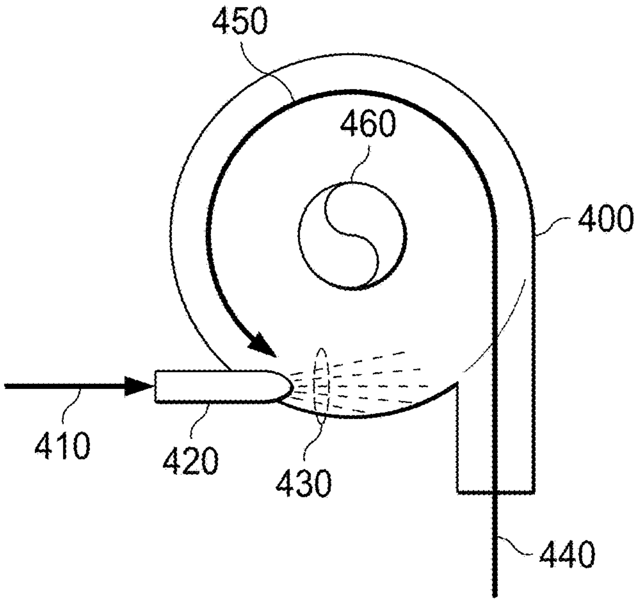
FIG. 3 is a top view of the exemplary tank shown in FIG. 2.

As shown in FIG. 3, particulate solids 440 carried by a fluid (e.g., water) enter the vessel 400. The ratio of solids and fluid generally may range from 1 volume percent solids to 50 volume percent solids. The particle top size can vary, depending on the application, between 5 mm to 10 micrometers. The particle composition can include metalliferous, aggregate, industrial mineral ores, tailings, and/or waste products created by hydrometallurgical, pyrometallurgical, and mineral processing operations.

The particulate material flow may enter the vessel 400 at a desired angle (e.g., nearly tangentially) to direct the solids along the periphery of the vessel wall. The particulate material flows along the periphery 450 due to centrifugal forces. The particles enter a zone where they come into contact with the cavitation bubbles 430 and experience the shock waves created by the bubble collapse. The areas where the particulate solids encounter the cavitation bubbles can be multiplied by positioning a plurality of cavitation nozzles along the vessel's periphery. Only one area is shown in FIG. 3 for clarity and convenience. The number and placement of cavitation nozzles and solids entry points can be selected to suit the application. Any desired angle of entry of cavitation flow may be used.

The particles and fluid entering the vessel 400 exit in two places: overflow 460 and underflow 470. Typically, most of the fluid mixed with relatively finely-sized particles 480 exits as overflow. A lesser quantity of fluid mixed with relatively coarse particles 490 exits the vessel as underflow. The size and shape of the vessel's cylindrical and conical sections, the length and diameter of the overflow device, the diameter of the underflow orifice, the pressure and flow rate of the particulate feed stream, and the flow rate of the fluid entering the cavitation nozzles, can be selected in one embodiment to partition the particle size distribution of particles reporting to overflow and underflow. This property enables the embodiment to both break and classify the particles to an advantage. For example, the overflow contains particles generally of a fine size that are predominately liberated and consist of distinctly separate mineral types that can be separated by a downstream process. The generally coarse particles reporting to underflow can be recirculated for further treatment to achieve a desired liberation.

The standalone vessel may be specifically designed for the application, with a diameter ranging from 4 inches (102 mm) to 36 inches (914 mm). The inlet pressure of the solids and water mixture may vary between 1 psi (7 k Pa) and 100 psi (689 kPa). The flow rate may range between 10 gpm (0.00076 m3/s) and 2000 gpm (0.15 m3/s). The feed pressure at the inlet of the cavitation nozzle may range between 100 psi (689 kPa) and 10,000 psi (68,900 kPa), and the flow rate may range from 0.0001 m3/s and 0.006 m3/s. Centrifugal slurry-duty pumps are suited to feed the particulate solids to the vessel. The model, size, and operating conditions may be specified by vendors to satisfy application requirements.

Positive-displacement pumps may feed clear water to the cavitation nozzles. The size and configuration of the pump may be specified by a vendor to satisfy the application. The vessel and wetted parts may be fabricated from a polymer, e.g. urethane, high molecular weight polyethylene, or abrasion-resistant steel alloy, or ceramic-lined mild steel to provide long service life.

Example of Use of Cavitation to Break Small Particles of Iron Ore Tailings

Figure 5:
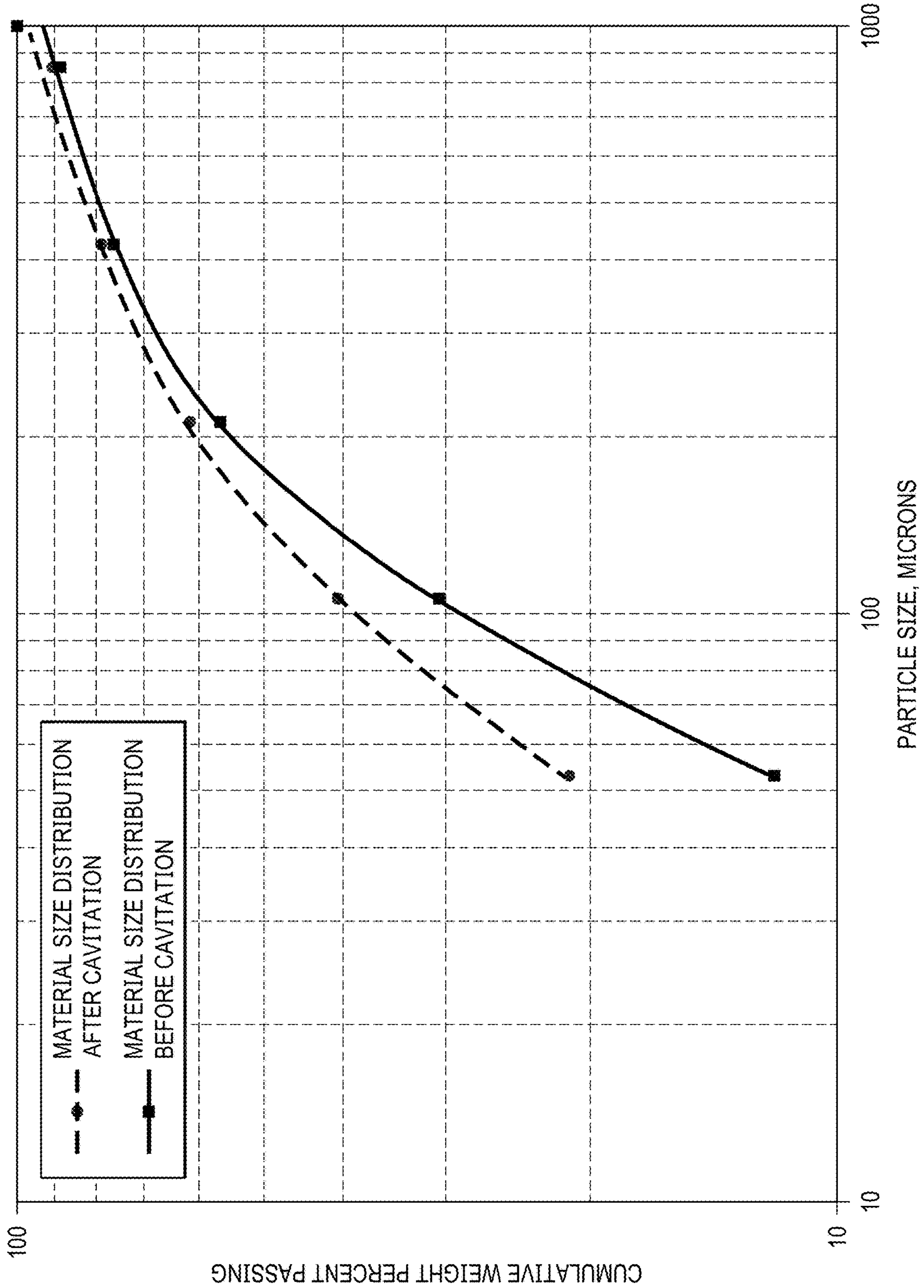
FIG. 5 is a Gaudin-Schumann plot that shows the significant breakage of iron ore tailings processed by cavitation.

A sample of 500 grams of iron ore tailings containing hematite, goethite, and quartz minerals with a top size of 1000 microns was mixed with 500 grams of water to produce 1000 grams of slurry with a solids concentration of 50 percent weight. The slurry was charged to a device to contact the solids with cavitation bubbles. The device consisted of a circular annular track 14 inches outer and 11 inches inner diameter. A cavitation nozzle was positioned on the outer wall of the annular track to admit cavitation bubbles tangentially into the slurry. The cavitation nozzle was fed 2.3 gallons per minute of water at 3,500 pounds per square inch pressure. The nozzle generated a plume of cavitation bubbles an inch wide and five inches long that entered the annular track at approximately 250 feet per second. The forces provided by the cavitation bubble stream rapidly propelled the slurry around the annular track for 60 seconds. After the test, the contents contained in the annular track were recovered and tested for particle size distribution. The particle size distribution of the solids subjected to the cavitation bubbles was compared to the particle size distribution of the sample known before treatment. Results, shown in FIGS. 4 and 5, demonstrate that significant breakage occurred. Results show that the number of particles finer than 100 microns increased from 29 weight percent to 39 weight percent after contact with cavitation bubbles. Breakage is required to liberate from quartz hematite and goethite, two valuable iron-containing minerals.

The method and system described herein is scalable for operations of any size. The system may be portable, e.g., disposed upon a trailer that may be moved from site to site. Use of the described system makes separation commercially feasible in instances wherein conventional separation processes are impractical. The devices, systems, and methods described herein may be particularly applicable to ores, such as but not limited to sandstone or highly disseminated rock types such as found in prophyry deposits for the recovery of selected minerals, such as iron compounds or other base metals.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. A method including the steps of: (a) providing two or more streams of fluids with heterogeneous mineral-based particulate entrained therein; (b) directing the two or more streams of fluid at one another to create, in an impact zone, collisions between the heterogeneous mineral-based particulate of the two or more streams of fluid; (c) exposing the heterogeneous mineral-based particulate to a first cavitation fluid, wherein the step of exposing the heterogeneous mineral-based particulate to a first cavitation fluid occurs after step (b), and wherein the step of exposing the heterogeneous mineral-based particulate to a first cavitation fluid occurs outside the impact zone.

2. A method including the steps of: (a) providing two or more streams of fluids with heterogeneous mineral-based particulate entrained therein; (b) directing the two or more streams of fluid at one another to create, in an impact zone, collisions between the heterogeneous mineral-based particulate of the two or more streams of fluid; (c) exposing the heterogeneous mineral-based particulate to a first cavitation fluid, wherein the step of exposing the heterogeneous mineral-based particulate to the first cavitation fluid occurs in the impact zone at the same time as step (b), and wherein the heterogeneous mineral-based particulate is exposed to a second cavitation fluid outside the impact zone after step (b).

* * * * *